United States Patent Office 3,449,298
Patented June 10, 1969

3,449,298
NORBORNANEDIOL CONDENSATION POLYMERS
Markus Matzner, Highland Park, N.J., assignor to Union Carbide Corporation, a corporation of New York
No Drawing. Filed Oct. 23, 1965, Ser. No. 504,239
Int. Cl. C08g *17/13, 21/00*
U.S. Cl. 260—47           7 Claims

ABSTRACT OF THE DISCLOSURE

Useful polycarbonates have been prepared by the phosgenation of either 2,5- or 2,6-bis(hydroxymethyl)norbornane in the presence of an organic compound containing a sterically unhindered heterocyclic, tertiary nitrogen atom, said compound being liquid at the reaction temperature, and a reaction temperature of from about 10° C. to about 150° C. Mixed polycarbonates can be made by copolymerizing either/or both of these bis(hydroxymethyl)norbornanes with aliphatic, alicyclic, or aromatic diols.

---

This invention relates to norbornanediol condensation polymers and more particularly to polycarbonates thereof.

There is a continuing need in the plastics industry for condensation polymers having high tensile strengths, tensile moduli, impact strengths and glass transition temperatures and good weathering characteristics.

It has now been found that normally solid, high molecular weight norbornanediol polycarbonates having the structural formula

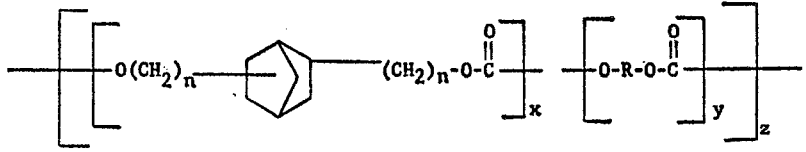

wherein $n$ is a number having values of 0 to 5 and R is the divalent hydrocarbon radical residuum of a dihydric organic compound, $z$ is an integer representing the degree of polymerization and is sufficiently high so as to afford a polycarbonate having a reduced viscosity of at least 0.4 when measured at 25° C. as a 0.2 g. sample in 100 ml. of chloroform, and $x$ and $y$ are integers such that $$\left(\frac{x}{x+y}\right) \cdot 100 = 100 \text{ to } 10 \text{ and } \left(\frac{y}{x+y}\right) \cdot 100 = 0 \text{ to } 90$$

have such properties.

When $y$ is 0 the above formula represents homopolycarbonates of norbornanediols. It is preferred to use as the parent norbornanediol one which is a mixture of 2,5- and 2,6-diol isomers, although either isomer alone can be used as well. The use of a pure isomer, of course, entails the added expense of an isomer separation step. It is particularly preferred to use those norbornanediols where $n$ is 0 to $n$ is 1. The preparation of these norbornanediols has been described in the literature.

The dihydric organic compound contributing the divalent hydrocarbon radical residuum R can be either a substituted or unsubstituted dihydric aliphatic, alicyclic, aromatic, alkylaromatic or arylaliphatic compound.

Examples of dihydric aliphatic compounds include ethylene glycol, 1,2-propylene glycol, 1,3-propylene glycol, 1,4-butanediol, 1,5-pentanediol and the like as well as alkyl and halogen substituted derivatives thereof. A preferred dihydric aliphatic compound is 2,2,3,3-tetrahalobutane - 1,4-diol with 2,2,3,3-tetrachlorobutane-1,4-diol being particularly preferred.

Illustrative of dihydric alicyclic compounds which can be used are cyclobutanediol, cyclopentanediol, cyclohexanediol, cyclohexanedimethanol, cyclohexanediethanol, bis(hydroxyethoxy)cyclohexane and the like as well as alkyl substituted derivatives thereof. The cyclobutanediols preferably have the hydroxyl substituents situated on opposing carbon atoms such as positions 1 and 3 of the cyclobutane ring. Such diols can be represented by the formula:

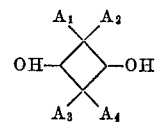

wherein $A_1$, $A_2$, $A_3$ and $A_4$ are either hydrogen or lower alkyl groups containing from one to four carbon atoms inclusive. A preferred cyclobutanediol is a 50/50 cis/trans-isomer mixture of 2,2,4,4-tetramethylcyclobutane-1,3-diol, although either the cis or trans isomers alone can be used as well as mixtures other than a 50/50 ratio.

The dihydric aromatic compounds can be either monocyclic or polycyclic.

Illustrative monocyclic dihydric aromatic compounds are hydroquinone, resorcinol, cathechol and alkylated or halogenated derivatives thereof.

Illustrative polycyclic dihydric aromatic compounds are the bis(hydroxyphenyl)alkanes such as:

2,2-bis(4-hydroxyphenyl)propane,
2,4'-dihydroxydiphenylmethane,
bis(2-hydroxyphenyl)methane,
bis(4-hydroxyphenyl)methane,
bis(4-hydroxy-2,6-dimethyl-3-methoxyphenyl) methane,
1,1-bis(4-hydroxyphenyl)ethane,
1,2-bis(4-hydroxyphenyl)ethane,
1,1-bis(4-hydroxy-2-chlorophenyl)ethane,
1,1-bis(3-methyl-4-hydroxyphenyl)ethane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane,
2,2-bis(2-isopropyl-4-hydroxyphenyl)propane,
2,2-bis(4-hydroxynaphtyl)propane,
2,2-bis(4-hydroxyphenyl)pentane,
3,3-bis(4-hydroxyphenyl)pentane,
2,2-bis(4-hydroxyphenyl)heptane,
bis(4-hydroxyphenyl)phenylmethane,
bis(4-hydroxyphenyl)cyclohexylmethane,
1,2-bis(4-hydroxyphenyl-1,2-bis(phenyl)propane,
2,2-bis(4-hydroxyphenyl)-1-phenyl-propane and the like;
as well as aryl halogen substituted derivatives thereof.

The preferred methods of preparing the normally solid, high molecular weight norbornanediol polycarbonates of the present invention are the pyridine catalyzed direct phosgenation and the pyridine catalyzed reaction of a chloroformate with a dihydric compound. The direct phosgenation method is accomplished by reacting less than 99 percent of a stoichiometric amount of phosgene with the dihydric (diol) reactant or reactants in the presence of from about 4 to about 20 mols per mol of diol reactant of an organic compound containing a sterically unhindered heterocyclic, tertiary nitrogen atom, said compound being liquid at the reaction temperature, at a reaction temperature of from about 10° C. to about 150° C. and thereafter adding at least the ultimate one percent of the stoichiometric quantity per four minute period. It is critical that the reaction proceed in the presence of an organic compound containing a sterically unhindered, heterocyclic, tertiary nitrogen atom and preferably from about 4 to about 8 carbon atoms inclusive, which compounds serve as catalysts in the reaction. It is believed that this catalyst functions by the acceptance of generated hydrochloric acid by the unhindered heterocyclic tertiary nitrogen atom which neither otherwise reacts within the polymerization system nor combines with or adversely affects either the diol reactant or phosgene.

Preferably, the catalysts used in this invention are nitrogen containing, heterocyclic compounds subject to the same criteria established above. While these catalysts can contain substituents in positions which do not sterically hinder the heterocyclic tertiary nitrogen atom such substituents must be inert to the phosgene and diol reactants under the conditions of the reaction. For this reason these catalysts cannot contain reactive substituents such as hydroxyl groups, carboxyl groups, primary or secondary amine groups or the like. Similarly, it should be noted that substituents which are made inactive by virtue of meshing groups such as hydrocarbon groups, for example, lower alkyl groups, are not offensive. Preferred substituents when present are lower alkyl groups although unsubstituted heterocyclic tertiary nitrogen containing compounds are most preferred.

Illustrative of such sterically unhindered, heterocyclic tertiary nitrogen containing compounds are pyrimidine, pyridine, N-alkyl substituted imidazole, isoquinoline, and the like. It should be noted that the tertiary nitrogen containing catalyst can contain inert substituents such as alkyl groups, chloro groups, fluoro groups, nitro groups, and the like, provided such substituents are positioned such that they do not sterically hinder the heterocyclic tertiary nitrogen atom.

Pyridine and pyridines substituted with inert substituents, especially lower alkyl groups in positions 3, 4, and 5 are preferred catalysts.

Illustrative of the effect of steric hindrance it has been found that for pyridine, by way of example, inert substituents located in positions other than 2 or 6 that is to say 3, 4 or 5 substituted pyridines provide effective catalysis. In comparison pyridine similarly substituted in either the 2 or 6 position provides little if any catalytic effect.

Since the pyridines provide an exceptionally high degree of catalysis and also because they are readily available and easily separated they are preferred catalysts in the conduct of the process of this invention.

The heterocyclic tertiary nitrogen containing catalyst is most desirably a liquid at the temperature at which the reaction is conducted, as the catalyst is brought into more intimate contact with the reactants, is more readily dispersed, and is more effectively separated from the reaction products. Additionally, the present of a liquid inert diluent or solvent can be used and preferably is used within certain limits to reduce the amount of catalyst used, and to increase dispersion of the catalyst.

It should be noted that it is not sufficient to utilize a mere catalytic or equivalent amount of catalyst in the conduct of this invention. While such an amount is sufficient to bind hydrogen chloride molecules formed during the reaction, it is insufficient to this invention, as the presence of such a minor amount of catalyst results in insufficient reaction and tends to favor undesirable side reactions. In this invention, the heterocyclic tertiary nitrogen containing catalyst should be used in an amount of from about 4 to about 20 mols of the heterocyclic tertiary nitrogen containing catalyst per mol diol reactant used. It is preferred, however, to use from about 3 mols to about 10 mols per mol diol reactant used. The preferred amounts provide completely effective catalysis and facilitate removal from the product.

It is also contemplated in this invention that nonreactive diluents or solvents be utilized in the reaction medium. The utilization of such solvent or diluent is in fact, preferred as the viscosity of the reaction mixture is thereby reduced and accordingly, the agitation and transfer of such mixture is facilitated.

Any suitable nonreactive or inert solvent or diluent can be used for this purpose. Illustrative of suitable inert solvents are benzene, chlorobenzene, toluene, xylene, tetrachloroethylene, carbon tetrachloride, chloroform, methylene chloride and the like.

Considering the solvent and tertiary nitrogen containing catalyst as both being part of the solvent or diluent system, the catalyst should comprise from 20 to 100 percent by weight of the solvent system the remaining 80 to 0 percent being suitable inert solvent or diluent. It has been found desirable, however, to utilize a solvent system comprising from 20 to 60 percent by weight of the catalyst and from 80 to 40 percent by weight of a suitable solvent based on the total solvent system. Since the quantity of catalyst used in the reaction system is determined in reference to the amount of diol reactant utilized as indicated above, the appropriate quantity of solvent or diluent utilized is readily determined in reference to the catalyst.

The direct phosgenation reaction of this invention is generally conducted at temperatures in the range of from about 10° C. to about 150° C. When the phosgenation reaction is conducted by a continuously slow rate of addition a single temperature within this range can be used to effect the phosgenation. It is preferred, however, to utilize a temperature in the range of from 10° C. to 60° C.

While a slow rate of addition can be effectively used to conduct the phosgenation of this invention, it has been found preferable to effect the phosgenation in two additions: an initial addition at a rapid rate and a final addition at a slow rate. When the two addition phosgenation method of this invention is used, it has been found that while the first amount of phosgene added is not especially critical, it is highly critical that at least the last one percent be added at the slow rate.

While the slow rate of addition can be extended over a long period of time limited only by the practicability of the addition period at least the last one percent should be added over a period of no less than about 4 minutes and preferably over a period of from about five minutes to about four hours. It will be appreciated by those skilled in the art that the amount of material reacted will to some extent determine the rate. For example, very large amounts would generally be extended over a longer period of time.

While as indicated above, at least the ultimate one percent of the stoichiometric amount of phosgene must be added at the slow rate, it has been found that excellent results are obtained when the amount of phosgene added in the first addition be from about 90 to about 99 percent of the stoichiometric amount of phosgene and that this addition be accomplished in a period of from about ten minutes to about two hours, and the last one to ten percent be added at the slow rate from about 4 to about 20 minutes or more per percent of the stoichiometric amount added in the ultimate charge. When the two addition charge is utilized it is desired to add the first or "fast rate" portion of phosgene at a temperature less than 60° C. within the temperature limits indicated above and preferably at a temperature of from 10° C. to 40° C.

The ultimate portion or "slow rate" portion of phosgene is desirably added at a temperature greater than 40° C. within the temperature limits established above and preferably at a temperature of from 40° C. to 60° C. The two portion addition is preferred over the single slow rate addition because the total time of addition is much less to produce substantially the same reaction efficiencies. The indicated temperature preferences are predicated on the enhanced yields of polymer exhibiting high molecular weight.

The most preferred method, however, has been found to be a three-step addition to which the "fast-rate" portion is added in two parts wherein from about 30 to 49 percent of the stoichiometric amount is added at a rapid rate at a temperature of from 10° to 20° C. and from 69 to 50 percent of the stoichiometric amount of phosgene is added at a rapid rate at a temperature of from about 20° C. to about 40° C. and at least the ultimate one per cent is added and generally the ultimate from 10 to 1 percent of the stoichiometric amount is added at the slow rate at a temperature in excess of 40° C. preferably from about 40° C. to about 60° C.

The slow addition rate of the ultimate portion of phosgene is believed to be desirable because of the low concentration of reactive hydroxyl groups that are present in the reaction mixture toward the end of the reaction.

A rapid rate of phosgene addition throughout the reaction causes rapid saturation in the remaining hydroxyl groups. This in turn tends to result in a low molecular weight, chloroformate terminated polymer. It should be noted that the reaction requires only an approximate control of the addition of phosgene. Sophisticated metering equipment is unnecessary. The end point in the reaction is signaled by a considerable increase in the viscosity of the mixture thereby indicating the presence of a high polymer.

It will be noted that the reactions of this invention should be conducted in the absence of air. This avoids undesirable and contaminating colored byproducts. In practice, this is readily effected by conducting the reaction under a blanket of inert gas, such as argon, helium, neon, or the like.

While it is not critical, the total reaction time should be preferably kept as low as possible. In practice, total reaction times of from 1 to 2 hours should be sufficient. Reaction cycles less than this can be utilized, however, provided the critical addition rates indicated above are employed. The preference for lower reaction cycles is dictated by product resins exhibiting improved color and reaction efficiencies.

The present process is effective for norbornanediol compounds having commercial grade purity. It is not required to use highly purified or reagent grade materials.

The isolation of the polymer is easily effected by filtering the polymer solution upon completion of the reaction. The filtrate is washed in acid, then washed in water. The polymer is isolated by either evaporation of the solvent or by coagulation in a nonsolvent. It should be noted and appreciated that variations in this process can be readily effected without departing from either the scope or the spirit of the present invention, for example, phosgene can be added to the norbornanediol reactant catalyst mixture, not as a gas, but rather as a liquid. A solution of diol can be added to a solution of phosgene in the solvent catalyst mixture. Instead of phosgene, bromo, iodo, and fluoro phosgene can also be used.

In the second method one half of the diol charge to be polymerized is phosgenated under conditions suitable to produce the corresponding dichloroformate which is purified, separated and subsequently reacted with the other half of the diol charge in the presence of greater than stoichiometric amounts of a catalyst (an organic compound containing a sterically unhindered tertiary nitrogen atom as explained supra). The sequence of operations can be illustrated by the following equations representing the formation of a polycarbonate from a mixture of 2,5- and 2,6-dihydroxynorbornane:

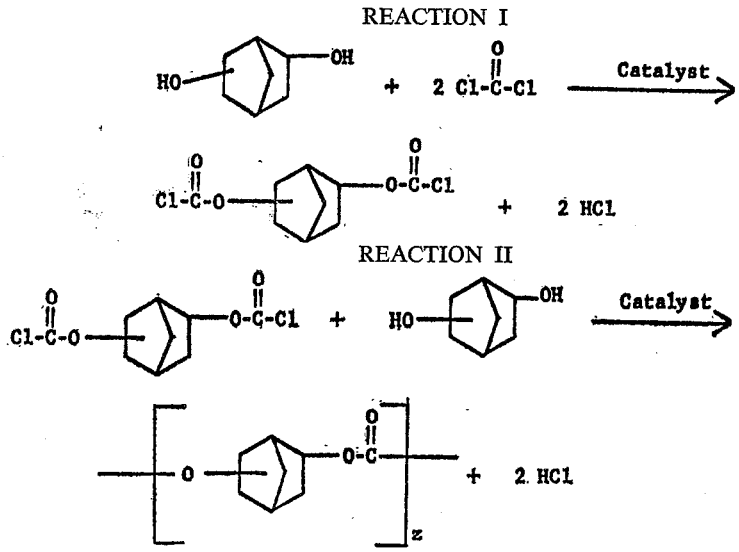

wherein z is as defined supra.

It is to be emphasized that norbornanediol polycarbonates prepared by the alcoholysis or ester interchange methods with a diaryl carbonate do not afford the high molecular weight polycarbonates of the present invention, that is, polycarbonates having a reduced viscosity of at least 0.4 when measured at 25° C. as a 0.2 g. sample in 100 ml. of chloroform. It is also unexpected that the weathering properties and resistance to sunlight evinced by the norbornanediol polycarbonates prepared by the preferred methods described in detail supra are not matched by norbornanediol polycarbonates prepared by the ester interchange method.

The invention is further illustrated by the examples which follow in which all parts and percentages are by weight unless otherwise specified.

Example 1

Into a three-neck, 500 ml. round bottom flask equipped with a mechanical stirrer, reflux condenser, thermometer, phosgene inlet-tube and dry-argon inlet tube was placed 19.53 g. (0.125 mole) of a mixture of 2,5- and 2,6-bis-(hydroxymethyl)norbornane, 80 ml. of pyridine and 120 ml. of dry toluene. Stirring was started and dry argon passed into the flask above the level of the reaction mixture. The reaction mixture was heated to its reflux temperature, maintained there for 5 minutes and then cooled at 43° C. Phosgene was then passed into the flask beneath the level of the reaction mixture. Approximately 97% of the required phosgene (12 g.) was added within 29 minutes. The flask temperature during the phosgene addition was kept below 50° C. by intermittent cooling. During this step a voluminous precipitate of pyridine hydrochloride formed. The rate of phosgene addition was then considerably decreased together with the application of mild heating. It took 3 hours and 44 minutes to add the final 3% of phosgene (about 0.37 g.) during which time the reaction mixture became very viscous. The flask temperature was about 54° C. when the addition of phosgene was stopped. The reaction mixture was coagulated in 1500 ml. of methanol affording a rubbery, light-yellow polycarbonate of a mixture of 2,5- and 2,6-bis(hydroxymethyl)norbornane. The crude polymer product was washed twice with methanol and twice with distilled water, using 1000 ml. of solvent each time with 5 minutes of vigorous agitation in a Waring Blendor. The product obtained in a yield of 93.6% had a reduced viscosity at 25° C. (0.2 g./100 ml. of chloroform) of 0.64.

The infrared spectrum of this polycarbonate included a strong carbonyl absorption band at about 5.75μ. A compression molded film had the following properties:

$T_g$=60–65° C.
Tensile modulus=350,000 p.s.i.
Elongation at break=2.5%
Tensile strength=7200 p.s.i.
Pendulum impact=13 ft.-lbs./in.$^3$ The gas permeabilities of this polycarbonate were very low as evinced by the date below.

| Gas: | Permeability in cc. ml./100 in.$^2$/24 hr./atm. |
| --- | --- |
| Hydrogen | 325 |
| Carbon dioxide | 30 |
| Oxygen | 12 |

When the polycarbonate of a mixture of 2,5- and 2,6-bis(hydroxymethyl)norbornane was made via alcoholysis or ester interchange with diphenyl carbonate only a low molecular weight polymer resulted as shown in the next example.

Example 2

A mixture of 3.115 g. (0.0199 mol) of a mixture of 2,5- and 2,6-bis(hydroxymethyl)norbornane, 4.2692 g. (0.0199 mol) of diphenyl carbonate and 0.0007 g. of LiOH·H$_2$O was heated in a round-bottom flask equipped with a gas-inlet tube and a distillation head under a dry argon atmosphere at 215° C. As phenol distilled from the flask the temperature was gradually increased to about 260° C. over a period of one hour. The pressure was reduced to 0.6–1.2 mm. as the temperature was increased to 270° C. over a period of 10 minutes. The reaction flask was kept under these conditions for an additional 50 minutes. The light yellow residue of polycarbonate of a mixture of 2,5- and 2,6-bis(hydroxymethyl)norbornane had a reduced viscosity of only 0.13 at 25° C. (0.2 g./100 ml. of chloroform).

Example 3

Into a 250 ml. round bottom 3-neck flask equipped with a reflux condenser, magnetic stirrer, dropping funnel and gas inlet tube were placed 8.073 g. (0.03 mol) of the dichloroformate of 2,2,4,4-tetramethylcyclobutane-1,3-diol, 0.6921 g. (0.0054 mol) of a mixture of 2,5- and 2,6-dihydroxynorbornane, 3.4608 g. (0.024 mol) of 2,2,4,4-tetramethylcyclobutane-1,3-diol and 60 ml. of toluene. A solution of 49.8 g. of pyridine (0.63 mol) in 30 ml. of toluene was placed in the dropping funnel. Stirring was started and a stream of dry argon passed into the flask above the surface of the reactants. The reactants were heated to the reflux temperatures, refluxing maintained for 5 minutes and then cooled to about 95° C.

The pyridine-toluene solution was added to the reactants dropwise at a rate sufficient to avoid a strong splashing and foaming reaction. The reaction time was about 10 minutes. A viscous, colorless solution remained in the flask. The copolycarbonate of a mixture of 2,5- and 2,6-dihydroxynorbornane and 2,2,4,4-tetramethylcyclobutane-1,3-diol was obtained by coagulation of the viscous product in methanol. After washing the crude polymer with methanol and water in a Waring Blendor as described for the product in Example 1, a colorless copolycarbonate was obtained in a yield of 86.7%, having a reduced viscosity of 0.83 (0.2 g./100 ml. of chloroform). A compression molded film of this copolycarbonate had the following properties:

$T_g$=140° C.
$T_m$=none (amorphous)
Tensile modulus=195,000 p.s.i.
Tensile strength=5,500 p.s.i.
Elongation at break=24%
Pendulum impact strength=100 ft.-lbs./in.$^3$ This copolycarbonate was stable under exposure to a 275 watt RS-Reflector sunlamp at a distance of 8–10 inches for a period of up to 3250 hours.

Example 4

The procedure and apparatus described in Example 3 were used with 1.765 g. (0.005 mol) of the dichloroformate of bisphenol-A 2,2-bis(p-hydroxyphenyl)propane, 0.6408 g. (0.005 mol) of a mixture of 2,5- and 2,6-dihydroxynorbornane and a solution of 8 ml. of dry pyridine in 8 ml. of dry chlorobenzene. The reaction time was 10 minutes. The copolycarbonate of bisphenol-A and the mixture of 2,5- and 2,6-dihydroxynorbornane was obtained in a yield of 82% and had a reduced viscosity at 25° C. of 1.37 (0.2 g./100 ml. of chloroform). A film of this copolycarbonate cast from chloroform had the following properties:

$T_g$=170–175° C.
$T_m$=none (amorphous)
Tensile modulus=320,000 p.s.i.
Tensile strength=8,700 p.s.i.
Elongation at break=4–9%
Pendulum impact strength=45 ft.-lbs./in.$^3$ Example 5

Using the same procedure and apparatus as described in Example 3 with 3.14 g. (0.0245 mol) of a mixture of 2,5- and 2,6-dihydroxynorbornane, 6.7275 g. (0.025 ml.) of 2,2,4,4-tetramethylcyclobutane-1,3-diol dichloroformate, 55 ml. of toluene and a solution of 41.5 g. of pyridine (0.525 ml.) in 20 ml. of toluene, a copolycarbonate of the mixture of 2,5- and 2,6-dihydroxynorbornane and 2,2,4,4-tetramethlylcyclobutane-1,3-diol was obtained in a yield of 90.8% having a reduced viscosity of 0.87 at 25° C. (0.2 g./100 ml. of chloroform).

A film of this copolycarbonate cast from chloroform had the following properties:

$T_g$=150–155° C.
$T_m$=none (amorphous)
Tensile modulus=275,000 p.s.i.
Tensile strength=4,200 p.s.i.
Elongation at break=1.7%
Pendulum impact strength=15 ft.-lbs./in.$^3$ Example 6

The same procedure and apparatus described in Example 3 was employed with 2.4541 g. (0.005 mol) of the dichloroformate of 2,2-bis(4-hydroxy-3,3-dichlorophenyl)propane, 0.6408 g. (0.005 mol) of a mixture of 2,5- and 2,6-dihydroxynorbornane, 5 ml. of chlorobenzene and a solution of 8 g. of pyridine (0.101 mol) in 3 ml. of chlorobenzene to afford a copolycarbonate of 2,2-bis(4-hydroxy-3,5-dichlorophenyl)propane and a mixture of 2,5- and 2,6-dihydroxynorbornane in a yield of 78% with a reduced viscosity 0.44 at 25° C. (0.2 g./100 ml. of chloroform).

Example 7

The procedure and apparatus described in Example 3 was used with 1.7641 g. (0.005 mol) of the dichloroformate of 2,3,3,3-tetrachlorobutanediol-1,4, 0.6408 g. (0.005 ml.) of a mixture of 2,5- and 2,6-dihydroxynorbornane, 5 ml. of benzene and a solution of 8 g. (0.101 mol) of pyridine in 3 ml. of benzene to afford a copolycarbonate of 2,2,3,3-tetrachlorobutane-1,4-diol and a mixture of 2,5- and 2,6-dihydroxynorbornane in a yield of 80% with a reduced viscosity of 0.40 at 25° C. (0.2 g./100 ml. of chloroform).

A film of this copolycarbonate cast from chloroform had the following properties:

$T_g$=65° C.
$T_m$=none (amorphous)
Tensile modulus=330,000 p.s.i.
Tensile strength=6,500 p.s.i.
Elongation at break=5%
Pendulum impact strength=25 ft.-lbs./in.$^3$

Example 8

The procedure and apparatus described in Example 3 was used with 8.073 g. (0.03 mol) of the dichloroformate of 2,2,4,4-tetramethylcyclobutane-1,3-diol, 3.8273 g. (0.0245 mol) of a mixture of 2,5- and 2,6-bis(hydroxymethyl)norbornane, 55 ml. of toluene and a solution of 41.5 g. (0.525 mol) of pyridine in 20 ml. of toluene. A copolycarbonate containing about 50 mole percent of the mixture of 2,5- and 2,6-bis(hydroxymethyl)norbornane was obtained in a yield of 87% and has a reduced viscosity at 25° C. of 0.65 (0.2 g./100 ml. of chloroform).

A film of this copolycarbonate cast from chloroform had the following properties:

$T_g$=85° C.
$T_m$=none (amorphous)
Tensile modulus=260,000 p.s.i.
Tensile strength=5,400 p.s.i.
Elongation at break=3–5%
Pendulum impact strength=20 ft.-lbs./in.$^3$

Example 9

The procedure and apparatus described in Example 3 was used with 8.073 g. (0.03 mol) of the dichloroformate of 2,2,4,4 - tetramethylcyclobutane - 1,3 - diol, 0.8435 g. (0.0054 mol) of a mixture of 2,5- and 2,6-bis(hydroxymethyl)norbornane, 3.4608 g. (0.024 mol) of 2,2,4,4-tetramethylcyclobutane-1,3-diol, 60 ml. of toluene and a solution of 49.8 g. (0.63 mol) of pyridine in 30 ml. of toluene. A copolycarbonate containing about 10 mole percent of the mixture of 2,5- and 2,6-bis(hydroxymethyl)norbornane was obtained in a yield of 90.6% and had a reduced viscoisty of 0.79 at 25° C. (0.2 g./100 ml. of chloroform).

A film of this copolycarbonate cast from chloroform had the following properties:

$T_g$=120–125° C.
$T_m$=none (amorphous)
Tensile modulus=190,000 p.s.i.
Tensile strength=4,700 p.s.i.
Elongation at break=4–40%
Pendulum impact strength=60 ft.-lbs./in.$^3$

Example 10

The procedure and apparatus described in Example 3 was used with 1.765 g. (0.005 mol) of the dichloroformate of bisphenol-A, 0.7811 g. (0.005 mol) of a mixture of 2,5- and 2,6-bis(hydroxymethyl)norbornane, 5 ml. of chlorobenzene and a solution of 8 g. (0.101 mol) of pyridine and 3 ml. of chlorobenzene. The copolycarbonate containing about 50 mole percent of the mixture of 2,5- and 2,6-bis-(hydroxymethyl)norbornane was obtained in a yield of 89.9% and had a reduced viscosity at 25° C. of 0.75 (0.2 g./100 ml. of chloroform).

A film of this copolycarbonate cast from chloroform had the following properties:

$T_g$=115° C.
$T_m$=none (amorphous)
Tensile modulus=340,000 p.s.i.
Tensile strength=7,800 p.s.i.
Elongation at break=5%
Pendulum impact strength=40 ft.-lbs./in.$^3$

Example 11

The procedure and apparatus described in Example 3 was used with 1.7641 g. (0.004 mol) of the dichloroformate of 2,2,3,3-tetrachlorobutane-1,4-diol, 0.7811 g. (0.005 mol) of a mixture of 2,5- and 2,6-bis(hydroxymethyl)norbornane, 5 ml. of benzene and a solution of 8 g. (0.101 mol) of pyridine and 3 ml. of benzene. The copolycarbonate of the mixture of 2,5- and 2,6-bis(hydroxymethyl)norbornane and 2,2,3,3-tetrachlorobutane-1,4-diol was obtained in a yield of 75.7% and had a reduced viscosity at 25° C. of 0.52 (0.2 g./100 ml. of chloroform).

A film of this copolycarbonate cast from chloroform had the following properties:

$T_g$=40–50° C.
$T_m$=none (amorphous)
Tensile modulus=245,000 p.s.i.
Tensile strength=4,000 p.s.i.
Elongation at break=65%
Pendulum impact strength=20 ft.-lbs./in.$^3$

Example 12

When the procedure described in Example 1 is followed substituting the 2,5-bis(hydroxymethyl)norbornane isomer for the 2,5-, 2,6-mixture a polycarbonate having similar properties to the copolycarbonate product of Example 1 is obtained.

Example 13

When the procedure described in Example 1 is followed substituting the 2,6-bis(hydroxymethyl)norbornane isomer for the 2,5-, 2,6-mixture a polycarbonate having similar properties to the copolycarbonate product of Example 1 is obtained.

The following tests were used in the evaluation of the polymers of this invention.

| Test. | ASTM |
|---|---|
| Tensile modulus | D–882 |
| Tensile strength | D–882 |
| Elongation at break | D–882 |
| Pendulum impact strength | D–256 |
| Gas permeability | D–1434 |

Glass transition temperatures, also referred to as second order phase transition temperatures, refer to the temperatures of the inflection points found by plotting the resilience (recovery from 1% elongation) of a film, ranging in thickness from 3–15 mils, against the temperature. A detailed explanation for determining resilience and inflection temperatures is to be found in an article by A. Brown in "Textile Research Journal," 25 (1955).

Reduced viscosity values were computed by use of the equation:

Reduced viscosity=$t_s-t_o/ct_o$ wherein $t_o$ is the efflux time of the solvent, $t_s$ is the efflux time of the polymer solution, $c$ is the concentration of the polymer solution in terms of grams of polymer per 100 ml. of solvent.

The polymers of this invention including polycarbonate homopolymers and copolymers can be used in the fabrication of molded shaped articles such as gears, wheels, containers and the like as well as for protective coatings, lacquers, fibers and self-supporting films suitable for packaging.

Although the invention has been described with a certain degree of particularity, it is understood that numerous changes can be made without departing from the spirit and scope of the invention.

What is claimed is:

1. Normally solid high molecular weight norbornanediol polycarbonate having the structural formula

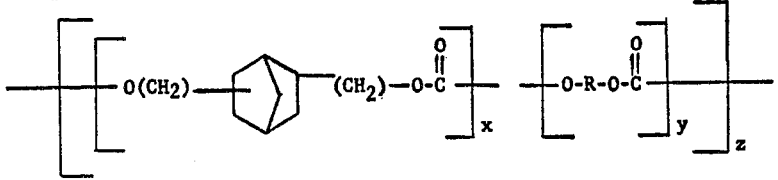

wherein R is a divalent hydrocarbon radical, z is an integer representing the degree of polymerization and is sufficiently high so as to afford a polycarbonate having a reduced viscosity of at least 0.4 when measured at 25° C. as a 0.2 g. sample in 100 ml. of chloroform and x and y are integers such that $$\left(\frac{x}{x+y}\right) \cdot 100 = 100 \text{ to } 10 \text{ and } \left(\frac{y}{x+y}\right) \cdot 100 = 0 \text{ to } 90$$

2. Polycarbonate claimed in claim 1 wherein y is 0.
3. Polycarbonate claimed in claim 1 wherein R is a divalent hydrocarbon radical derived from 2,2,4,4-tetramethylcyclobutane-1,3-diol.
4. Polycarbonate claimed in claim 1 wherein R is a divalent hydrocarbon radical derived from 2,2-bis(p-hydroxyphenyl)propane.
5. Polycarbonate claimed in claim 1 wherein R is a divalent hydrocarbon radical derived from 2,2,3,3-tetrachlorobutanediol-1,4.
6. A film prepared from the polycarbonate claimed in claim 1.
7. A fiber prepared from the polycarbonate claimed in claim 1.

References Cited

UNITED STATES PATENTS

| | | | |
|---|---|---|---|
| 3,213,061 | 10/1965 | Caldwell et al. | 260—47 |
| 3,313,777 | 4/1967 | Elam et al. | 260—47 |
| 3,317,466 | 5/1967 | Caldwell et al. | 260—47 |
| 3,326,855 | 6/1967 | Matzner et al. | 260—47 |

SAMUEL H. BLECH, *Primary Examiner.*

U.S. Cl. X.R.

260—77.5, 33.8, 463, 617